United States Patent
Steiner et al.

(10) Patent No.: US 8,922,923 B2
(45) Date of Patent: Dec. 30, 2014

(54) INTERLEAVED AUTOMATIC GAIN CONTROL FOR ASYMMETRIC DATA SIGNALS

(75) Inventors: Philip L. Steiner, Los Altos, CA (US);
Nan-Hsiung Yeh, Foster City, CA (US);
Mathew P. Vea, Shrewsbury, MA (US)

(73) Assignee: Seagate Technology LLC, Cupertino, CA (US)

( * ) Notice: Subject to any disclaimer, the term of this patent is extended or adjusted under 35 U.S.C. 154(b) by 565 days.

(21) Appl. No.: 13/037,764

(22) Filed: Mar. 1, 2011

(65) Prior Publication Data

US 2012/0224277 A1 Sep. 6, 2012

(51) Int. Cl.
G11B 5/09 (2006.01)
G11B 20/10 (2006.01)
G11B 5/74 (2006.01)
G11B 5/012 (2006.01)

(52) U.S. Cl.
CPC .............. G11B 5/746 (2013.01); G11B 5/012 (2013.01); G11B 20/10296 (2013.01); G11B 20/10314 (2013.01); G11B 20/10509 (2013.01); G11B 2220/252 (2013.01)
USPC .................. 360/32; 360/25; 360/46; 360/48; 360/65; 360/67

(58) Field of Classification Search
None
See application file for complete search history.

(56) References Cited

U.S. PATENT DOCUMENTS

| | | | |
|---|---|---|---|
| 5,099,367 A | 3/1992 | Sidman | |
| 5,410,556 A * | 4/1995 | Yeh et al. | 714/795 |
| 5,418,494 A | 5/1995 | Betti et al. | |
| 5,430,768 A * | 7/1995 | Minuhin et al. | 375/340 |
| 5,448,424 A | 9/1995 | Hirano et al. | |
| 5,459,757 A | 10/1995 | Minuhin et al. | |
| 5,689,532 A * | 11/1997 | Fitzpatrick | 375/341 |
| 5,862,005 A | 1/1999 | Leis et al. | |
| 6,108,152 A | 8/2000 | Du et al. | |
| 6,115,198 A * | 9/2000 | Reed et al. | 360/46 |
| 6,147,828 A | 11/2000 | Bloodworth et al. | |
| 6,163,420 A * | 12/2000 | Poss | 360/46 |
| 6,185,174 B1 | 2/2001 | Belser | |
| 6,282,038 B1 | 8/2001 | Bonaccio et al. | |
| 6,333,926 B1 | 12/2001 | Van Heeswyk et al. | |
| 6,441,983 B1 | 8/2002 | Philpott et al. | |
| 6,452,990 B1 | 9/2002 | Leis et al. | |
| 6,496,550 B1 * | 12/2002 | Bruccoleri et al. | 375/345 |
| 6,515,812 B1 | 2/2003 | Bergmans et al. | |
| 6,590,728 B1 | 7/2003 | Yang | |
| 6,771,441 B2 | 8/2004 | Tang et al. | |
| 6,804,805 B2 | 10/2004 | Rub | |
| 6,839,193 B2 | 1/2005 | Chong et al. | |
| 6,853,510 B2 | 2/2005 | Chaiken et al. | |

(Continued)

Primary Examiner — Dismery Mercedes
(74) Attorney, Agent, or Firm — Hollingsworth Davis, LLC

(57) ABSTRACT

A data signal comprising an even component and an odd component with differing amplitudes is received at a main automatic gain controller (AGC). The even component is adjusted by a first interleaved AGC and the odd component is adjusted by a second interleaved AGC such that even and odd component amplitudes are substantially equal. Amplitude adjusted even and odd components are recombined to define a data signal with components having substantially equal amplitudes. The even and odd components can be generated by a read transducer moving relative to a magnetic storage medium comprising tracks defined by discrete and spaced-apart recording bits arranged in an interspersed pattern. A read channel separates the data signal into even and odd samples such that a gain can be independently adjusted for each of the even and odd samples to compensate for asymmetry between the even and odd samples.

18 Claims, 11 Drawing Sheets

(56) References Cited

U.S. PATENT DOCUMENTS

| | | |
|---|---|---|
| 6,876,580 B2 | 4/2005 | Honda |
| 6,958,958 B2 * | 10/2005 | Iimura ................ 369/47.22 |
| 7,075,369 B2 | 7/2006 | Takenaka |
| 7,161,752 B1 | 1/2007 | Cheng |
| 7,233,270 B2 * | 6/2007 | Lin ................ 341/118 |
| 7,242,545 B1 | 7/2007 | Cheng et al. |
| 7,339,434 B1 | 3/2008 | Shirvani-mahdavi et al. |
| 7,382,408 B2 | 6/2008 | Rossi |
| 7,558,551 B2 | 7/2009 | Bargroff et al. |
| 7,667,912 B2 | 2/2010 | Goldberg et al. |
| 7,730,379 B2 | 6/2010 | Chen |
| 7,741,909 B2 | 6/2010 | Tong et al. |
| 7,777,624 B2 | 8/2010 | Wu et al. |
| 7,809,088 B2 | 10/2010 | Zerbe et al. |
| 8,385,016 B1 * | 2/2013 | Tang ................ 360/67 |
| 2002/0075585 A1 | 6/2002 | Luong et al. |
| 2002/0150179 A1 * | 10/2002 | Leis et al. ................ 375/340 |
| 2003/0072231 A1 * | 4/2003 | Matsui ................ 369/47.22 |
| 2005/0248873 A1 * | 11/2005 | Coker et al. ................ 360/75 |
| 2006/0256463 A1 * | 11/2006 | Ozdemir ................ 360/46 |
| 2007/0111661 A1 | 5/2007 | Bargroff et al. |
| 2009/0002868 A1 * | 1/2009 | Mallary et al. ................ 360/55 |
| 2009/0072905 A1 | 3/2009 | Duong et al. |
| 2009/0154626 A1 | 6/2009 | Anderson et al. |
| 2009/0195909 A1 | 8/2009 | Eleftheriou et al. |
| 2009/0195916 A1 | 8/2009 | Chauhan et al. |
| 2009/0239491 A1 | 9/2009 | Bargroff et al. |
| 2010/0054324 A1 | 3/2010 | Bulzacchelli et al. |
| 2010/0080071 A1 | 4/2010 | Huang et al. |
| 2010/0195088 A1 | 8/2010 | D'aligny et al. |
| 2010/0211830 A1 | 8/2010 | Sankaranarayanan et al. |

* cited by examiner

INTERLEAVED AUTOMATIC GAIN CONTROL FOR ASYMMETRIC DATA SIGNALS

SUMMARY

Embodiments of the disclosure are directed to methods for receiving at a main automatic gain controller (AGC) a data signal separated into an even component and an odd component with differing amplitudes, adjusting the even component with a first interleaved AGC and the odd component with a second interleaved AGC such that an even component amplitude and an odd component amplitude are substantially equal, and recombining the even component and the odd component.

Embodiments according to the disclosure are directed to a data storage system which includes a magnetic storage medium comprising a plurality of tracks defined by a plurality of discrete and spaced-apart recording bits arranged in an interspersed pattern, a read transducer that generates a data signal based on detecting the recording bits on the magnetic storage medium, and a read channel that separates the data signal into an even sample and an odd sample such that a gain can be independently adjusted for each of the even sample and the odd sample to compensate for asymmetry between the even sample and the odd sample.

These and other features can be understood in view of the following detailed discussion and the accompanying drawings.

DETAILED DESCRIPTION

Figure 1:
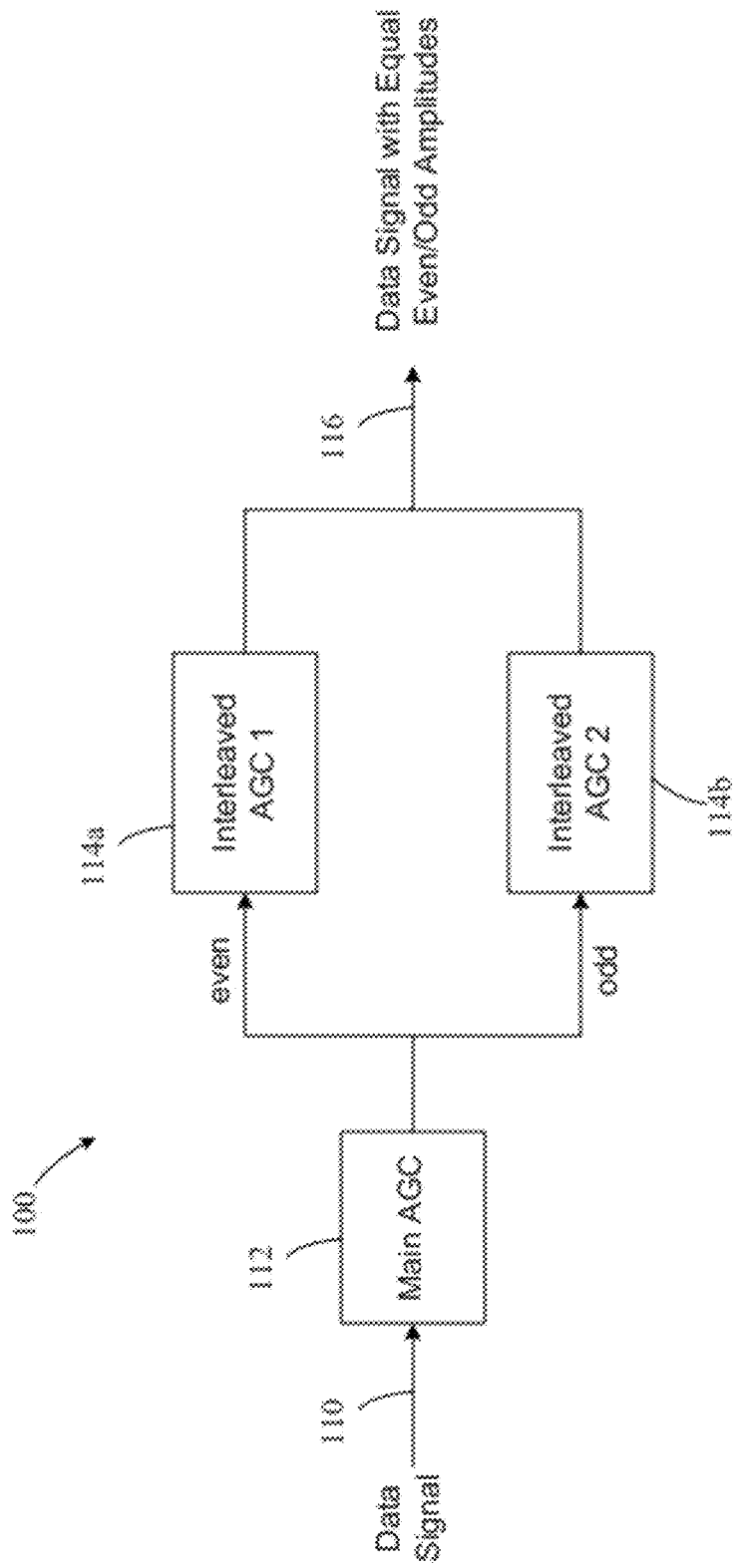
FIG. 1 shows an automatic gain control circuit to adjust even and odd data signal components separately according to various embodiments.

Due to high track density of bit patterned magnetic storage media (BPM), a read transducer is typically designed to concurrently read back two data tracks comprising interleaved magnetic dots. The interleaved magnetic dots are typically arranged in a staggered pattern, in which the magnetic dots of one track define even dots and those of an adjacent track define odd dots. When the read transducer moves slightly away from a centerline position between two adjacent tracks, the read signal amplitudes developed from the even and odd dots may become non-uniform or asymmetric. Asymmetry in even and odd read signal amplitudes may also result from asymmetric side reading of magnetic dots of the two tracks by the read transducer.

Conventional automatic gain control cannot compensate for this amplitude imbalance due to read transducer off-track movement or asymmetric side reading of recording bits, which results in higher amplitude for even samples and lower amplitude for odd samples or vice versa. Unbalanced even and odd sample amplitudes are detrimental to sequence detection and result in poor bit error rates. Asymmetry in even and odd sample amplitudes can also result in generation of erroneous information which is fed to the timing loop of the read channel and may cause timing recovery failure. Although amplitude differences between even and odd samples can be used for servo compensation, impairment of recorded data detection has already occurred.

Embodiments disclosed herein are directed to data channels that employ interleaved AGCs which provide independent control of the gain of each of a multiplicity of sub-channels (e.g., even and odd sub-channels). Interleaved AGCs according to various embodiments provide for independent control of sub-channel gain for a multiplicity of sub-channels so that the amplitudes of pairs or sets of the samples concurrently input to the sub-channels can be adjusted and made substantially uniform. Samples of balanced amplitude output from the multiplicity of sub-channels can be used for a number of purposes, including one or a combination of enhanced sequence detection, enhanced timing loop control, and enhanced control of data channel gain, among others. Although embodiments of the disclosure are generally described in the context of magnetic recording systems such as hard disk drives, it is understood that interleaved AGC methodologies described herein may be implemented in a variety of data channels, including communication channels.

According to some embodiments, interleaved AGCs are configured to process asymmetric data signals, such as a data signal separated into an even component and an odd component with differing amplitudes. Asymmetric data signals may be generated by a transducer reading recording bits interspersed (e.g., staggered) on magnetic storage media. By way of example, two interleaved AGCs, one controlling even samples and the other controlling odd samples, may be implemented in a data path. Independent control of even and odd sample gains allows the interleaved data samples to always have the same amplitude in both on-track and off-track situations. The sequence detector will never see unbalanced amplitude for even and odd bit streams, for example. The timing loop will also see consistent amplitudes from even and odd samples without any confusion. Moreover, any difference between even and odd AGC gains can be fed back to the servo for tracking correction, further reducing the sampling imbalance from the source.

According to some methods, a transducer is moved relative to a magnetic storage medium, the magnetic storage medium comprising a multiplicity of tracks each defined by a multiplicity of discrete and space-apart recording bits arranged in an interspersed pattern. Methods involve reading recording bits of the interspersed pattern defining a first track and recording bits of the interspersed pattern defining a second track using the transducer. The recording bits read by the transducer are separated into even samples and odd samples. The even samples are received by a first interleaved AGC, and the odd samples are received by a second interleaved AGC. Methods further involve adjusting a gain of either of the first and second interleaved AGCs so that amplitudes of even and odd output samples produced at outputs of the first and second interleaved AGCs are substantially equal.

In some cases, the gain of either of the first and second interleaved AGCs is adjusted to compensate for movement of the transducer away from a centerline defined between the first and second tracks. In other cases, the gain of either or both of the first and second interleaved AGCs is adjusted to compensate for asymmetric side reading of recording bits of the first or second tracks by the transducer element.

In some embodiments, the read channel is configured to process a full response signal with no controlled intersymbol interference. In other embodiments, the read channel is configured to process a partial response signal with controlled intersymbol interference. Some methods, for example, involve recombining the even and odd output samples having substantially equal amplitude, shaping the recombined even and odd output samples in accordance with a predetermined target, and performing sequence detection on the recombined and shaped even and odd output samples.

Various methods may involve adjusting a timing loop of the read channel using the even and odd output samples having substantially equal amplitude. Various methods may involve generating servo control signals using the even and odd output samples having substantially equal amplitude.

According to other methods, a transducer is moved relative to a magnetic storage medium, the magnetic storage medium comprising a multiplicity of tracks each defined by a multiplicity of discrete and space-apart recording bits arranged in an interspersed pattern. Recording bits of the interspersed pattern are read using the transducer. Methods further involve separating the recording bits read by the transducer as even samples of an even channel and odd samples of an odd channel, and independently controlling gains of the even and odd channels to compensate for asymmetry of even and odd sample amplitudes. In some cases, the read channel may be configured to process a full response signal with no controlled intersymbol interference. In other cases, the read channel may be configured to process a partial response signal with controlled intersymbol interference.

In accordance with other embodiments, apparatuses of the disclosure include a transducer configured to read recording bits arranged in an interspersed pattern on a magnetic storage medium, the interspersed bit pattern defining a multiplicity of data tracks comprising one or more arrays of the recording bits. A read channel is communicatively coupled to the transducer and comprises interleaved automatic gain control circuitry. The interleaved automatic gain control circuitry comprises a multiplicity of automatic gain controllers. The interleaved AGCs are coupled to a multiplicity of sub-channels of the read channel. Circuitry is coupled to the multiplicity of interleaved AGCs and configured to separate samples corresponding to recording bits of each data track for reception by the multiplicity of sub-channels. Each of the interleaved AGCs is responsive to control signals for independently controlling a gain of its corresponding sub-channel so that amplitudes of output samples produced at respective outputs of the interleaved AGCs are forced to be substantially equal.

In some apparatuses, each of the interleaved AGCs independently controls the gain of its corresponding sub-channel so that amplitudes of the output samples produced at respective outputs of the interleaved AGCs are maintained substantially equal irrespective of whether or not the transducer maintains a centerline position relative to adjacent data tracks. In other apparatuses, the output sample amplitudes are maintained substantially equal by the interleaved AGCs so as to prevent skewing in a timing loop of the read channel that would otherwise occur to compensate for asymmetry of the output sample amplitudes. The read channel may be configured to process full response samples with no controlled intersymbol interference. The read channel may be configured to process partial response samples with controlled intersymbol interference.

Apparatuses of the disclosure may include circuitry configured to recombine the output samples provided at the respective outputs of the interleaved AGCs in accordance with a predetermined target. A sequence detector may be configured to perform sequence detection on the recombined output samples, where the target comprises a polynomial.

FIG. 1 shows automatic gain control circuitry 100 that adjusts even and odd components of a data signal 110 separately in accordance with various embodiments. A data signal 110 is received by a main AGC 112. The data signal 110 may be an analog or digital signal that is communicated to the main AGC 112 via a data path or channel. The even and odd signal components received by the main AGC 112 have differing amplitudes. The circuitry 100 includes a first interleaved AGC 114a and a second interleaved AGC 114b respectively coupled to an output of the main AGC 112. The even signal component output from the main AGC 112 is received by the first interleaved AGC 114a, and the odd signal component output from the main AGC 112 is received by the second interleaved AGC 114b.

The even signal component can be adjusted by the first interleaved AGC 114a and the odd signal component can be adjusted by the second interleaved AGC 114b such that amplitudes of the even and odd signal components respectively output from the first and second interleaved AGCs 114a and 114b are substantially equal. The amplitude adjusted even and odd signal components are recombined and communicated as a data signal 116 to downstream circuitry.

Figure 2:
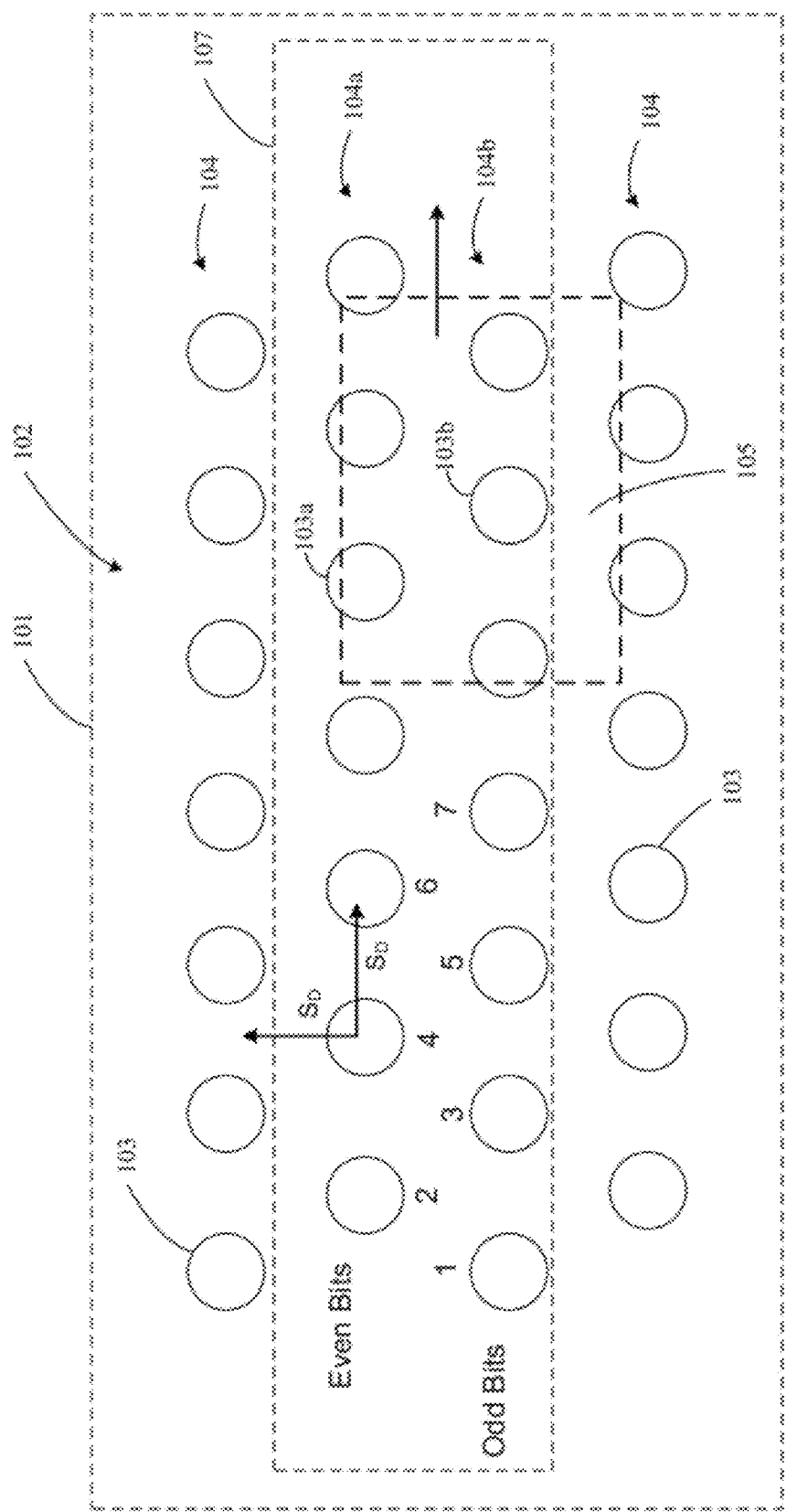
FIG. 2 shows a portion of a magnetic storage medium which includes an interspersed data bit pattern arranged in a generally staggered manner according to various embodiments.

FIG. 2 illustrates a portion 101 of a magnetic storage medium which includes an interspersed recording bit pattern 102. The interspersed data bit pattern 102 comprises a multiplicity of discrete recording bits 103 arranged in a generally staggered pattern. The recording bits 103 shown in the representative illustration of FIG. 2 are spaced apart from one another by a spacing distance, $S_D$, both radially and circumferentially. It is understood that other spacing configurations may be used to form a staggered recording bit pattern on a magnetic storage medium, such as patterns having different radial and circumferential bit spacing.

Recording bits are understood to be magnetic bits in which a transducer, such as a read/write head, can repeatedly record and/or overwrite data (e.g., "customer data"). Recording bits differ from servo bits, in that servo bits are typically not repeatedly recorded and/or overwritten in the same way as for recording bits.

The magnetic storage medium supporting the interspersed data bit pattern 102 typically includes a non-magnetic substrate with an overlying magnetic recording layer with perpendicular anisotropy, along with one or more interlayers between the substrate and the magnetic layer according to various implementations. The magnetic layer may be patterned to form the discrete recording bits 103, through, for example, lithographic patterning or self-organizing nanoparticle arrays.

According to embodiments in which the magnetic storage medium is implemented as a disk, the recording bits 103 extend around the disk and may be divided into a multiplicity of data regions or arrays 107, such as two or more concentrically spaced data tracks 104 arranged generally perpendicular to the radius of the disk. It can be appreciated that data arrays 107 having other configurations and geometries are contemplated (e.g., data arrays formed as straight rows of recording bits for magnetic storage media other than disks).

In FIG. 2, the data arrays 107 comprise a staggered, two-bit wide bit pattern, it being understood that data arrays 107 may be wider than two bits according to various embodiments. FIG. 2 further shows a transducer 105 configured to read a two-bit wide bit pattern for two adjacent tracks 104a, 104b defining the representative data array 107 shown in FIG. 2.

The data array 107 includes a first group 104a of "even" recording bits and a second group 104b of "odd" recording bits. The terms "even" and "odd" in this context are used merely for purposes of clarity of explanation (e.g., to differentiate between different tracks 104 of a staggered pattern of recording bits defining the array 107). Due to the high track density of bit pattern magnetic storage media, a transducer 105 (e.g., read transducer or reader) is typically designed to concurrently read back two tracks 104 with staggered magnetic bits 103.

In order to effectively sense the magnetic fields emanating from the recording bits 103 and/or to adequately induce a magnetic field in a particular recording bit 103 in the data array 107, the transducer 105 is controlled to maintain its position over the centerline of the data array 107 as it passes over the array 107. Because the transducer 105 passes freely over the data array 107, the position of the transducer 105 can tend to deviate from the array centerline. Such deviations from the array center, if sufficiently pronounced as in the case depicted in FIG. 2, can result in the amplitudes of the even bit samples differing to varying degrees from those of the odd bit samples.

For example, and with continued reference to FIG. 2, as the transducer 105 moves from the array centerline toward the odd recording bits 104b, the transducer 105 is unable to sense the full magnetic field generated by each of the even recording bits 104a, while the full magnetic field generated by each of the odd recording bits 104b is sensed. A similar, but opposite, effect occurs when the transducer 105 deviates from the array centerline toward the even recording bits 104a, resulting in the transducer 105 being unable to sense the full magnetic field generated by each of the odd recording bits 104b. Differences in even recording bit sensing relative to odd recording bit sensing results in a corresponding difference in even and odd recording bit sample amplitudes. As discussed above, unbalanced even and odd recording bit sample amplitudes are detrimental to sequence detection and result in poor bit error rates, among other maladies.

Figure 3:
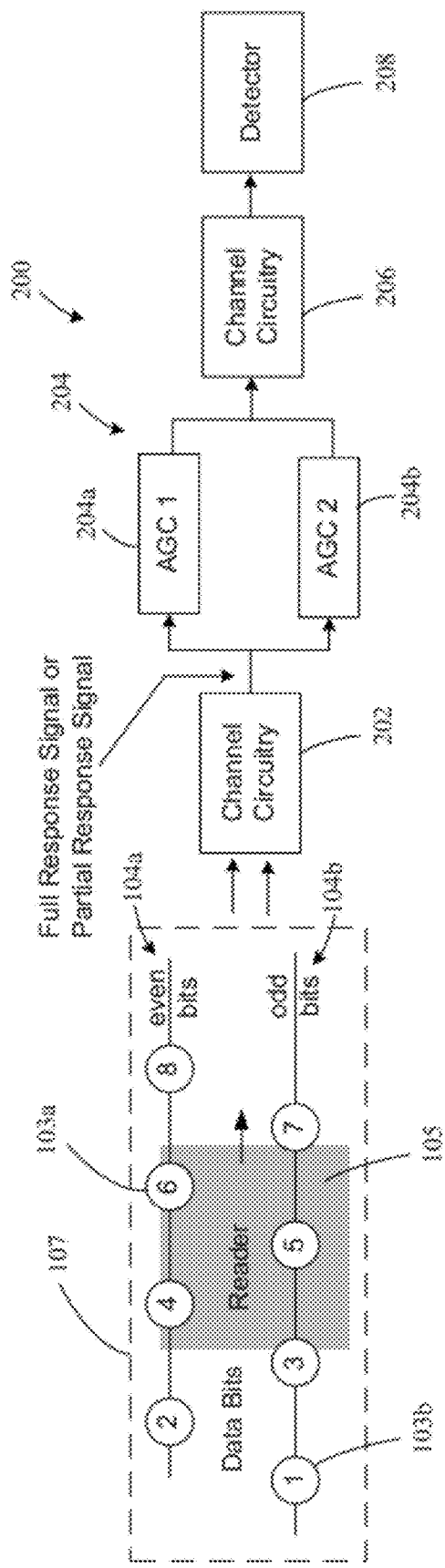
FIG. 3 shows a read channel that can be configured to process full response signals or partial response signals, the read channel including interleaved automatic gain control circuitry according to various embodiments.

FIG. 3 illustrates an embodiment of an interleaved AGC configuration for interspersed bit pattern magnetic storage media. The interleaved AGC configuration shown in FIG. 3, in general terms, includes circuitry for separating a data stream comprising samples corresponding to recording bits of a staggered bit pattern into odd and even channels with independent gain control prior to the feedback path for the timing loop of the read channel. This splitting of the data stream prevents skewing in the timing loop that would otherwise occur to compensate for the odd/even amplitude asymmetry.

The embodiment of FIG. 3 can differ in how the even and odd channels are split. In some configurations, the read channel is equalized to a full response channel, where each sample processed in the even and odd channels corresponds to one bit without any even/odd intersymbol interference (ISI). In other configurations, the read channel is equalized to a partial response channel with controlled intersymbol interference (ISI). The partial response channel may employ a target polynomial defined, for example, by $1-\alpha^2 D^2$, which completely removes even/odd ISI.

In the representative embodiment of FIG. 3, a transducer 105 (e.g., a reader) is shown moving relative to a data array 107. The data array 107 is shown to comprise even recording bits 104a and odd recording bits 104b. The transducer 105 is shown deviating from a centerline between the even and odd recording bits 104a, 104b. A read channel 200 is configured to compensate for asymmetry in even and odd sample amplitudes resulting from transducer deviation from the data array centerline.

The read channel 200 shown in FIG. 3 includes interleaved AGC circuitry 204 for independently adjusting the amplitudes of even and odd samples corresponding to even and odd recording bits 103a, 103b of the data array 107. The interleaved AGC circuitry 204 of FIG. 3 includes dual AGC controllers 204a and 204b. The gain of each of AGC 204a and AGC 204b is independently controllable, such that amplitudes of even and odd output signals from AGCs 204a and 204b can be independently adjusted.

Channel circuitry 202 is shown preceding the interleaved AGC circuitry 204, and channel circuitry 206 is shown following the interleaved AGC circuitry 204. As will be discussed in greater detail hereinbelow, the channel circuitry 202 of the embodiment shown in FIG. 3 can be configured for processing a full response signal with no intersymbol interference (ISI), which is input to the AGC circuitry 204. The channel circuitry 202 can also be configured for processing a partial response signal with controlled minimal even/odd ISI, which is input to the AGC circuitry 204.

Channel circuitry 206 can be implemented to be any full or partial response channel optimized for data detection by the detector 208 after even and odd amplitude asymmetry correction. It is noted that channel circuitry 206 is independent of the settings in channel circuitry 202. However, the channel target polynomial in channel circuitry 206 has to be divisible by the channel target polynomial in channel circuitry 202. In the various channel configurations that can be implemented in accordance with embodiments of the disclosure, the AGC circuitry 204 acts to force the even and odd samples to have substantially equal amplitude. When channel circuitry 202 is configured for full response, channel circuitry 206 can be configured as any optimal full response or partial response channel appropriate for the channel bit density.

Figure 4:
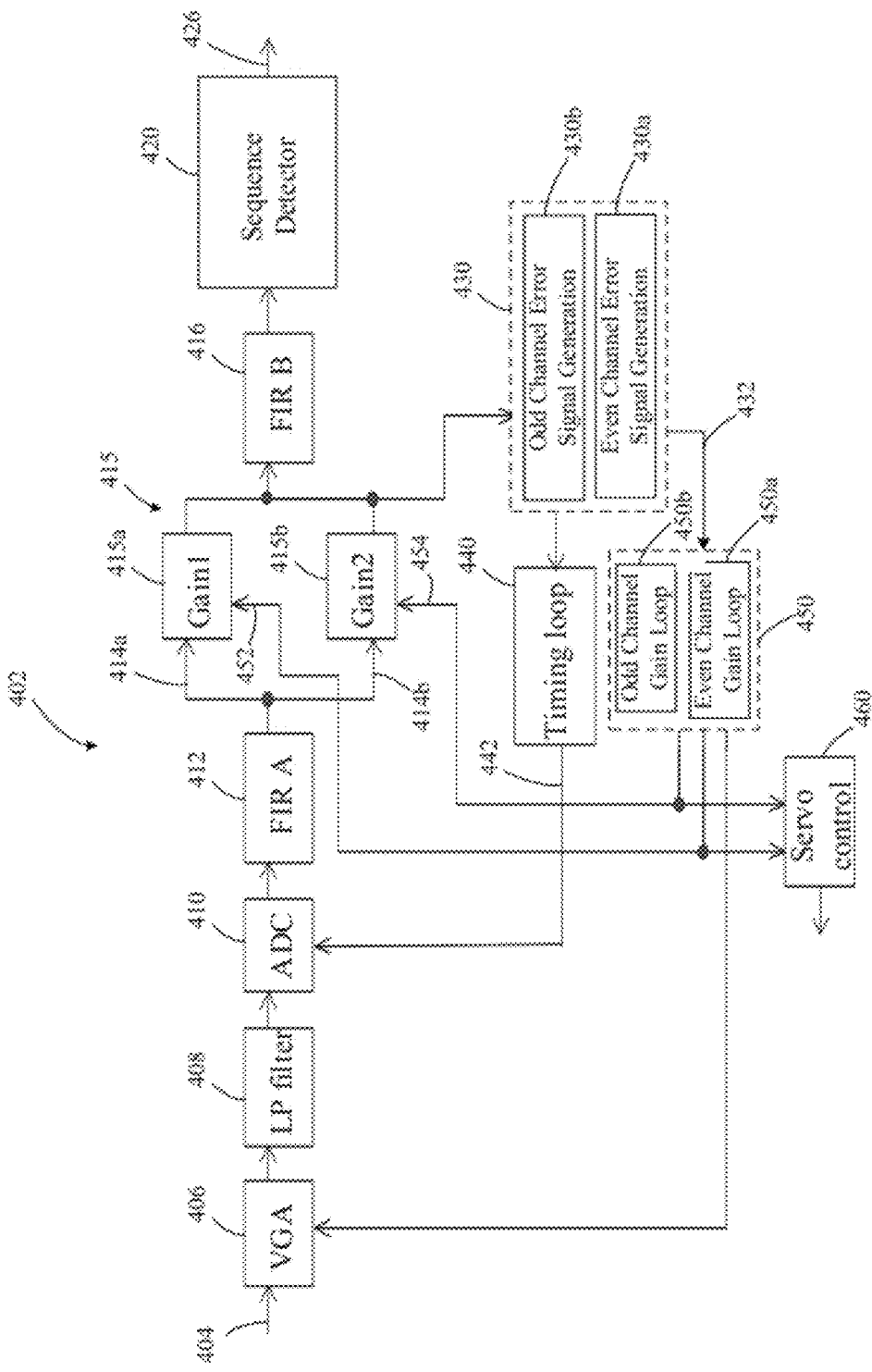
FIG. 4 is a block diagram of read channel circuitry for processing a data stream acquired from a magnetic storage medium, the read channel including interleaved automatic gain control circuitry according to various embodiments.

FIG. 4 is a block diagram of read channel circuitry 402 for processing a data stream acquired from a magnetic storage medium. The read channel circuitry 402 includes interleaved AGC circuitry 415 in accordance with various embodiments. As will later be described in detail, the block diagram shown in FIG. 4 includes components that can be arranged and configured to process various types of read channel signals. For example, and as previously discussed with reference to FIG. 3, the read channel circuitry 402 with interleaved AGC circuitry 415 can be implemented to process various types of full response data streams and partial response data streams.

It is to be understood that those of ordinary skill in the art would appreciate that not all components shown in the block diagram of FIG. 4 are needed for implementing certain embodiments for processing particular types of data streams, and that fewer components, additional components, or components other than those shown in FIG. 4 may be employed.

In the block diagram illustrated in FIG. 4, the data stream is received at an input 404 of a variable gain amplifier (VGA) 406. The VGA 406 is responsive to control signals, including signals received from a gain loop 450 of the read channel. The gain of VGA 406 is controlled to limit the amplitude of the data stream to within limits of an analog-to-digital converter (ADC) 410 prior to processing by the ADC 410. The data stream output from the VGA 406 is low-passed filtered by LP filter 408. The LP filter 408 is preferably a tunable lowpass filter, such as a continuous time (CT) filter. The filtered data stream output from the LP filter 408 is converted from an analog data stream to a digital data stream by ADC 410.

In accordance with channel embodiments that process a full response data stream, a first finite impulse response (FIR) filter 412 receives the digital data stream and performs equalization of the digital data stream to separate out even samples and odd samples of the data stream. Separating even from odd samples of the digital data stream is based on timing information provided by a timing loop 440 of the read channel circuitry 402. Because the full response data stream does not have even/odd intersymbol interference, each even sample and each odd sample output from the ADC 410 and input to the FIR filter 412 corresponds to one even bit and one odd bit, respectively.

Even samples are transmitted to the interleaved AGC circuitry 415 via an even channel 414a, and odd samples are transmitted to the interleaved AGC circuitry 415 via an odd channel 414b, based on timing information 442 provided by the timing loop 440. Timing within the timing loop 440 is based primarily on the time separation of the spatially separated and sequentially sensed even and odd magnetic transitions (gain compensated via the interleaved AGC circuitry 415) of the staggered bit pattern on the magnetic storage media.

The interleaved AGC circuitry 415 shown in FIG. 4 includes a first AGC 415a and a second AGC 415b. For purposes of convenience, the first AGC 415a will be described as receiving and processing even samples received from the FIR filter 412, and the second AGC 415b will be described as receiving and processing odd samples received from the FIR filter 412.

It can be seen in FIG. 4 that the gain loop 450 comprises two independent AGC loops; even channel gain loop 450a and odd channel gain loop 450b. FIG. 4 also shows that error signal generator 430 comprises two independent error signal generators; even channel error signal generator 430a and odd channel signal generator 430b. Outputs of the first and second AGCs 415a and 415b are coupled to the even and odd channel gain loops 450a, 450b and the even and odd channel error signal generators 430a, 430b. The even and odd channel error signal generators 430a, 430b are coupled to the timing loop 440 and to the even and odd channel gain loops 450a, 450b, respectively.

The output of the even channel gain loop 450a is coupled to the control input 452 of the first AGC 415a, and the output of the odd channel gain loop 450b is coupled to the control input 454 of the second AGC 415b. It is noted that both gain error signals and time error signals are time multiplexed with respect to AGCs 415a and 415b. Although not shown in FIG. 4, this time multiplexing aspect can be depicted by addition of a demultiplexer before the interleaved AGC circuitry 415 and a multiplexer after the interleaved AGC circuitry 415, for example.

The amplitudes of even and odd samples respectively input to the first and second AGCs 415a and 415b are adjusted to force the even and odd samples to have substantially equal amplitude on a bit-wise basis. In cases where an amplitude imbalance occurs for a particular pair of even and odd samples input to the first and second AGCs 415a and 415b, an error signal 432 is generated by the even or odd channel error signal generators 430a, 430b which is indicative of the amplitude imbalance. Independent error signals are propagated through the even and odd gain loops 450a, 450b and received at the control inputs 452 and 454 of the first and second AGCs 415a and 415b, respectively. The gains of the first and second AGCs 415a and 415b are automatically adjusted based on the control signals 452 and 454 received from the gain loop 450 so that the amplitudes of the pair of even and odd samples respectively output from the first and second AGCs 415a and 415b and transmitted to a second FIR filter 416 are substantially equal.

As is further shown in FIG. 4, an error signal 442 indicative of the amplitude even and odd sample amplitude differential is generated by the even and odd channel error signal generators 430a, 430b and transmitted to the timing loop 440 of the read channel circuitry 402. The error signal 442 is propagated through the timing loop 440 and input to a control input of the ADC 410. The timing of analog-to-digital conversion of even and odd samples by the ADC 410 is adjusted to compensate for skewing in the timing loop that would otherwise occur to compensate for the odd/even amplitude asymmetry.

Even and odd samples of substantially equal amplitude are output from the first and second AGCs 415a and 415b and transmitted to the second FIR filter 416. The second FIR filter 416 combines the even and odd samples for equalization, and generates equalized samples at its output for sequence detection by a sequence detector 420. In general, the second FIR filter 416 is configured to equalize the recombined samples in a manner suitable for the particular type of sequence detector 420. More particularly, the second FIR filter 416 serves to shape the recombined samples received from the interleaved AGC circuitry 415 into a predetermined mathematical form referred to as a target or target polynomial, which mathematically describes the extent of overlap between adjacent magnetic bits of the staggered bit pattern supported by the magnetic storage medium. Target polynomials are generally programmable and are selected so that noise in the final equalized signal is uncorrelated from bit to bit.

As is shown in FIG. 4, the sequence detector 420, in various embodiments, may include a maximum likelihood detector (e.g., a partial response maximum likelihood detector) for performing sequence detection on partial response signals. In the case of partial response samples, various target polynomials may be employed, such as $1-\alpha^2 D^2$. For example, the sequence detector 420 may be implemented as a Viterbi detector that determines the most likely bit sequence that would have generated the read signal acquired from the staggered bit pattern on the magnetic recording medium through use of a least-squared error metric.

When the first FIR filter 412 equalizes a signal to a full response signal according to various embodiments, the second FIR filter 416 can be configured to operate on either a full or a partial response signal with or without even/odd interference. When the first FIR filter 412 equalizes a signal to a partial response signal with no even/odd interference, the second FIR filter 416 has to equalize the signal to a partial response target with no even/odd interference. The detected sequence of samples, typically representative of customer data, is output from the sequence detector 420 and transferred to downstream components, such as an interface of a disk drive system.

As discussed above, the interleaved AGC circuitry 415 according to various embodiments provides for fine (or coarse) adjustment of AGC circuitry gain to correct amplitude imbalance of even and odd samples to ensure that the sequence detector 420 sees a uniform amplitude for all samples. The balanced even and odd samples also provides for accurate phase and frequency error information to the timing loop 440. Furthermore, the control signals for the first and second AGCs 415a and 415b can be used to drive the servo controller 460 and bring the head back on a track centerline in response to detection and correction of even and odd sample amplitude imbalance. It is significant that, even during an off-track period when the servo controller 460 attempts to bring the head back to the track centerline, the sequence detector 420 and the timing loop 440 never encounter any imbalance of even and odd sample amplitudes. This ensures the integrity of data detection and read clock recovery.

Figure 5:
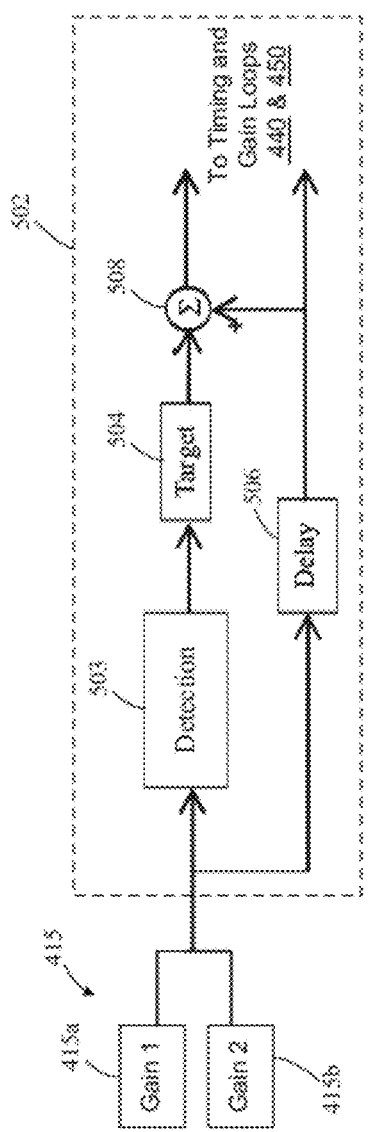
FIG. 5 is a block diagram showing various components or functions involving error signal generation according to various embodiments.

FIG. 5 is a block diagram showing various components or functions involving error signal generation according to various embodiments. It is understood that the various components or functions depicted in FIG. 5 are implemented in both the even and odd channel error signal generators discussed previously, but only one error signal generator channel is shown for purposes of simplicity. The block diagram of FIG. 5 can be implemented to process full response signals or partial response signals while using interleaved AGC circuitry described hereinabove. FIG. 5 includes interleaved AGC circuitry 415 as shown in FIG. 4, but excludes components that precede the interleaved AGC circuitry 415 for simplicity of explanation. FIG. 5 is provided to enhance an appreciation of differences in embodiments that process full response signals relative to those that process partial response signals.

According to embodiments that process partial response signals, even/odd samples having balanced amplitudes (via processed described hereinabove) are communicated to error signal generation circuitry 502, which includes a detector 503, a target 504, a delay unit 506, and a summer 508. The detector 503 may be a maximum likelihood detector programmed to implement a Viterbi algorithm. The target 504 is preferably a polynomial having the form of $1-\alpha^2 D^2$, and the delay unit 506 provides a delay operator (e.g., a unit delay operator) to the summer 508 appropriate for the detector 503 and target 504. The error signal generation circuitry 502 outputs an error signal to the timing and control loops 440 and 450.

According to embodiments that process full response signals, detection by the detector 503 is relatively straightforward using a binary detector, such as a slicer, and a target of unity, which may be considered a pass-through target. A significant advantage of using a slicer to detect data for the purpose of error signal generation is that it has very low latency. Low latency is helpful to any loop performance, both gain and timing in the context of the embodiments described herein. For the partial response case, the two detectors will have distinct targets and therefore are functionally distinct. Outputs from the circuitry depicted in FIG. 5 are communicated to the timing and gain loops 440 and 450 for making timing and gain adjustments as described previously.

Figure 6:
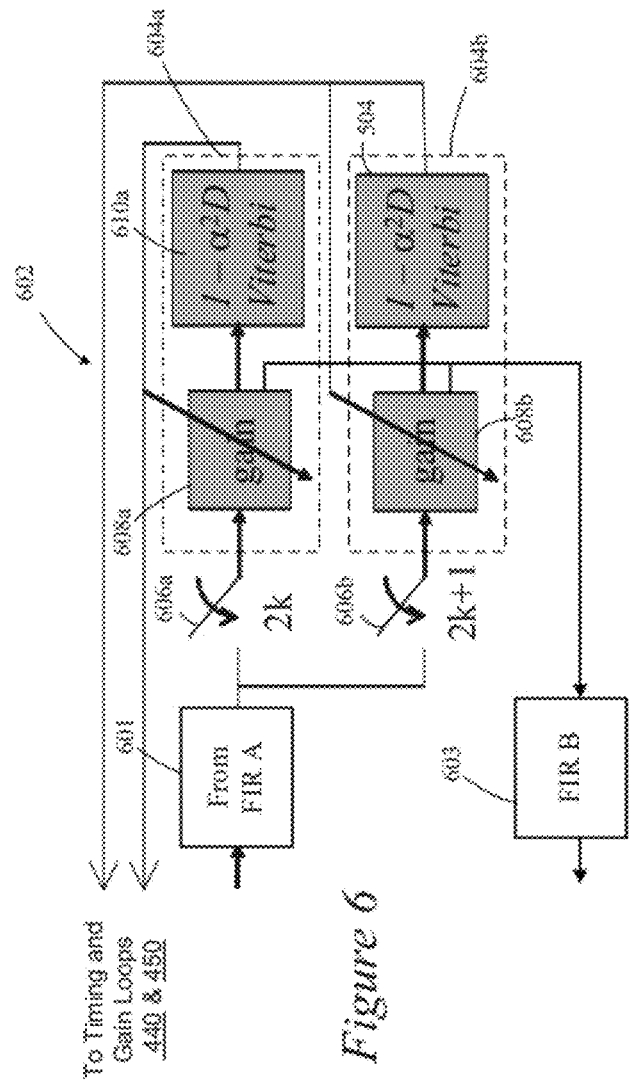
FIG. 6 is a block diagram of an embodiment of the error signal generation circuitry shown in FIG. 5.

FIG. 6 is a block diagram of an embodiment of the error signal generation circuitry shown in FIG. 5. The error signal generation circuitry 602 shown in FIG. 6 is configured to operate on partial response signals according to various embodiments. Error signal generation according to FIG. 6 is performed using two interleaved equalization blocks 604a and 604b each with independent automatic gain control. In FIG. 6, samples corresponding to recording bits stored on a staggered bit patterned medium are communicated to a first FIR filter 601, which facilitates conversion of $1+\alpha D$ equalization to $1-\alpha^2 D^2$. The samples output from the first FIR filter 601 are separated into even and odd samples, as denoted by switches 606a and 606b having offset switching timing controlled by the timing loop of the read channel circuitry.

The even samples are communicated along an even sub-channel, which includes equalization block 604a, and the odd samples are communicated along an odd sub-channel, which includes equalization block 604b. Each of the two interleaved equalization blocks 604a and 604b includes independent automatic gain control components 608a and 608b respectively coupled to a half-rate Viterbi detector 610a and 610b. It is noted that the value of the delay operator "D" of each of the two half-rate Viterbi detectors 610a and 610b is one-half the value of the delay operator "D" of the fixed $1-\alpha D$ operator 601.

Even and odd samples are gain adjusted by the automatic gain control components 608a and 608b so that the half-rate Viterbi detectors 610a and 610b see even and odd samples of substantially equal amplitude, respectively. Equalized samples output from at least one of the half-rate Viterbi detectors 610a and 610b are propagated along timing and gain loops 440 and 450 and used for controlling upstream components of the read channel circuitry in a manner described above with reference to FIG. 4.

Turning now to FIGS. 7A-11, there are shown representative flow diagrams of processes involving interleaved automatic gain control for asymmetric data signals according to various embodiments. The processes shown in FIGS. 7A-11 can be implemented, for example, by the apparatuses shown in FIGS. 1-6.

Figure 7A:
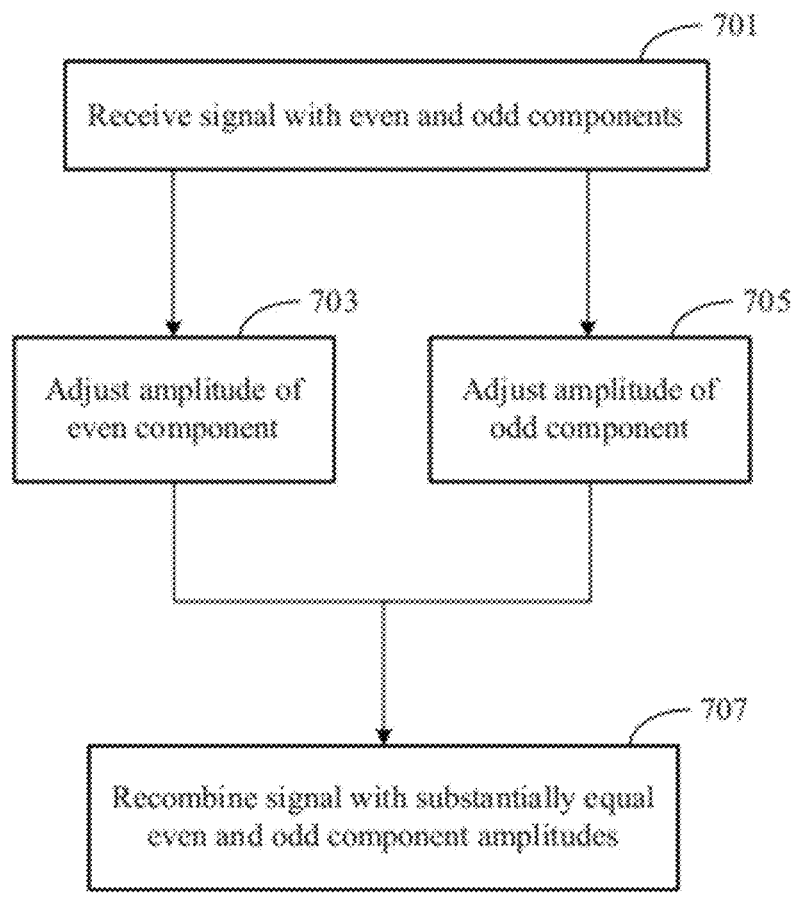
FIGS. 7A-11 are flow diagrams of processes involving interleaved automatic gain control for bit patterned magnetic storage media according to various embodiments.

In accordance with the embodiment shown in FIG. 7A, a data signal comprising even and odd signal components is received 701 and processed by interleaved automatic gain control circuitry. The interleaved automatic gain control operates on the data signal by adjusting 703, 705 the amplitude of one or both of the even and odd signal components so that these amplitudes are substantially the same. The amplitude adjusted even and odd signal components are recombined 707 to define a data signal having signal components with substantially equal amplitudes.

Figure 7B:
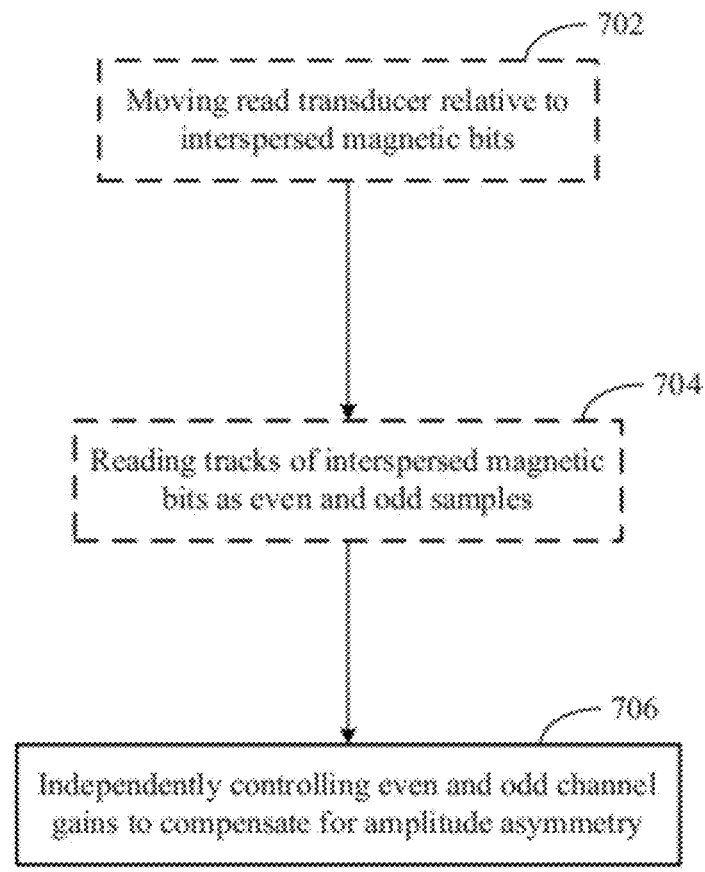

According to the embodiment shown in FIG. 7B, a read transducer is moved 702 relative to a magnetic storage medium comprising interspersed magnetic bits. Using the read transducer, at least two tracks of interspersed magnetic bits are concurrently read 704 as even samples of an even channel and odd samples of an odd channel. Gains of the even and odd channels are independently controlled 706 to compensate for asymmetry of even and odd sample amplitudes.

Figure 8:
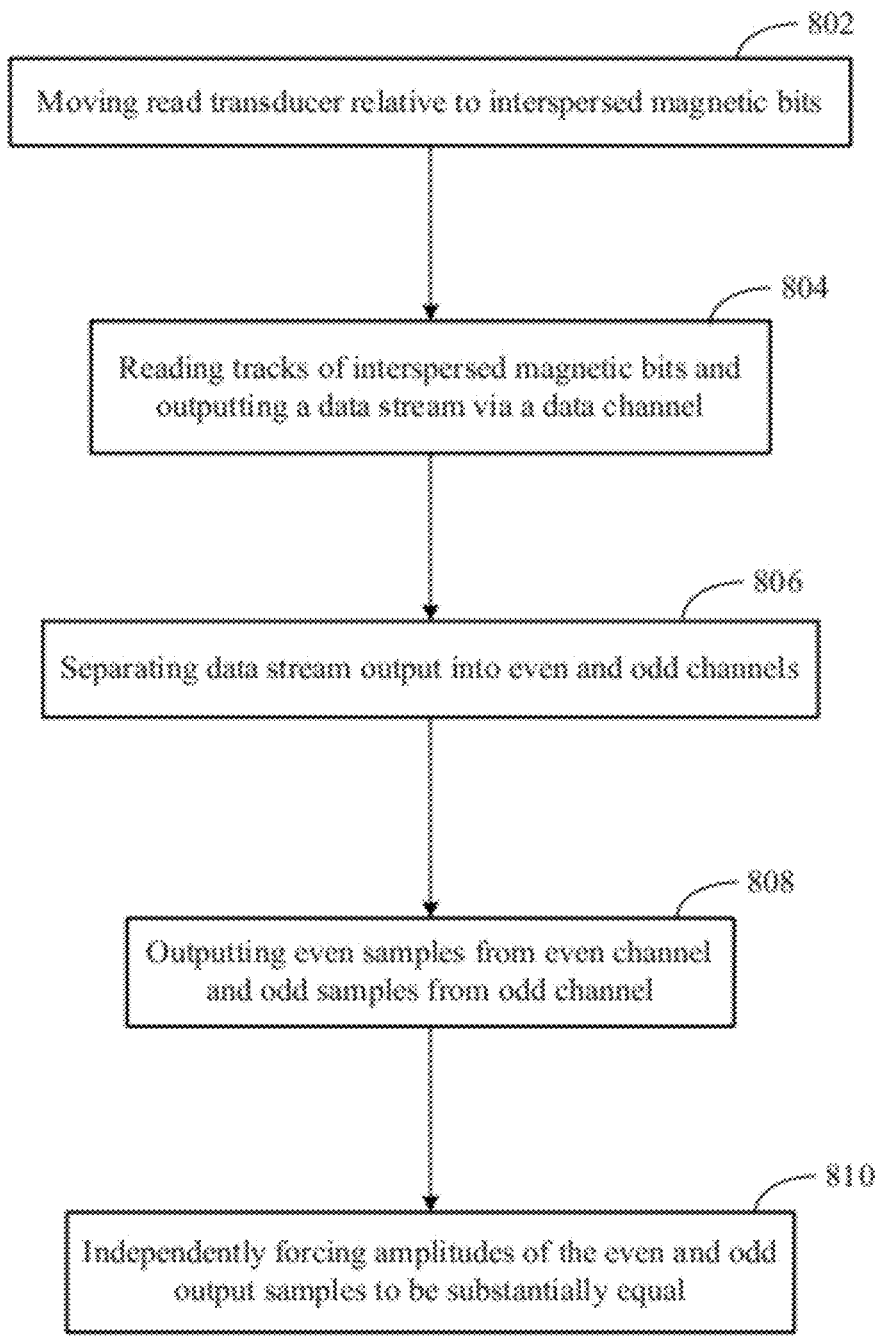

In the embodiment of FIG. 8, a read transducer is moved 802 relative to a magnetic storage medium comprising interspersed magnetic bits. At least two tracks of interspersed magnetic bits are concurrently read 804 using a read transducer. A data stream is output via a data channel. The data stream output from the data channel is separated 806 into an even channel and an odd channel. Even samples are output from the even channel, and odd samples are output 808 from the odd channel. A gain of the even and odd channels is independently controlled 810 so that amplitudes of the even and odd output samples are forced to be substantially equal.

Figure 9:
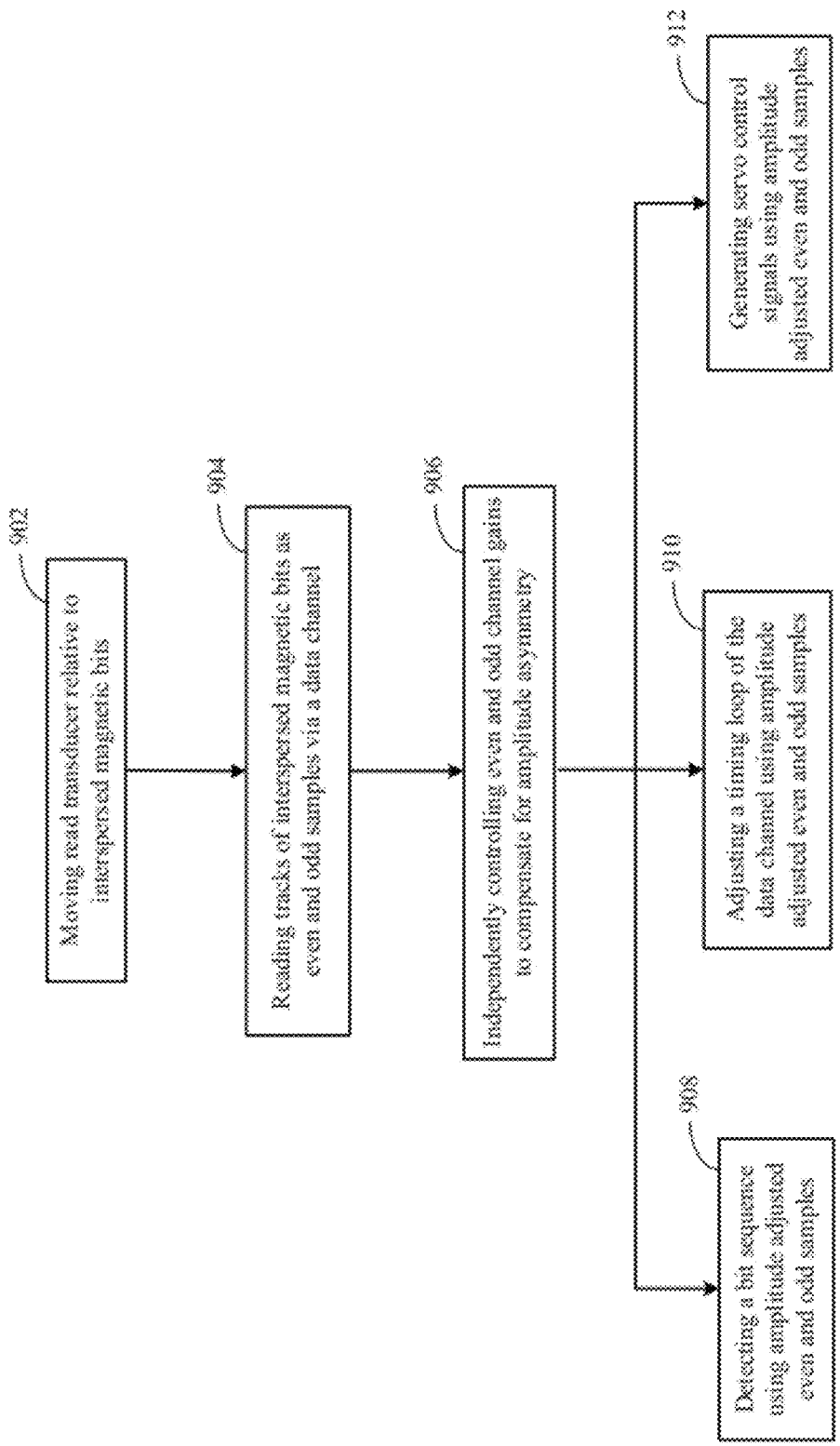

With reference to FIG. 9, this embodiment involves moving 902 a read transducer relative to a magnetic storage medium comprising interspersed magnetic bits, and concurrently reading 904 at least two tracks of interspersed magnetic bits as even samples and odd samples via a data channel using the read transducer. This embodiment also involves independently controlling gains 906 of an even channel of even samples and an odd channel of odd samples to compensate for amplitude asymmetry of even and odd samples received from the data channel. One, two, or all three of the following operations may be performed in accordance with various embodiments: detecting 908 a bit sequence using the even and odd samples of substantially equal amplitude; adjusting 910 a timing loop of the data channel using the even and odd samples of substantially equal amplitude; and generating 912 servo control signals using the even and odd samples of substantially equal amplitude.

Figure 10:
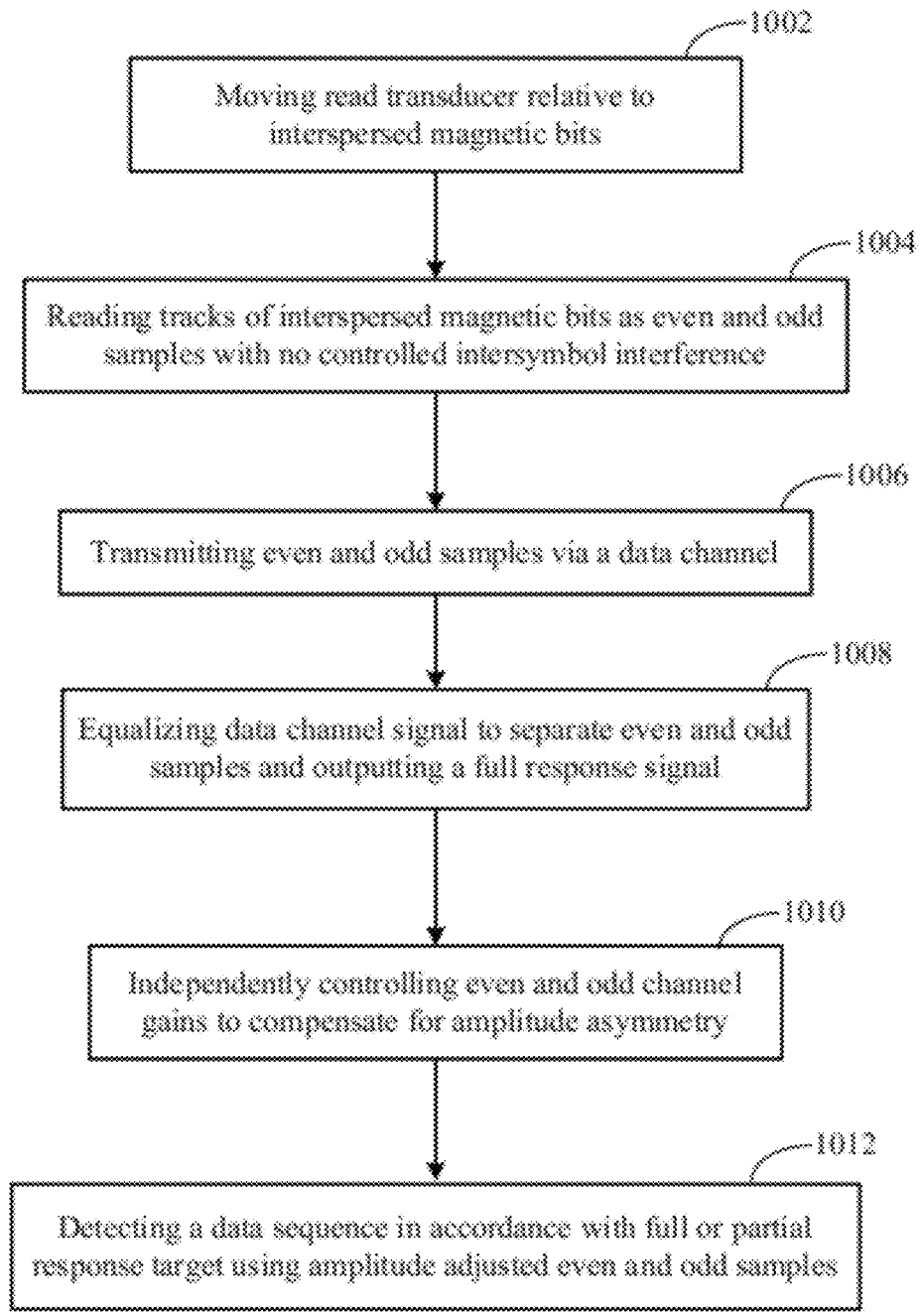

Referring to FIG. 10, this embodiment involves moving 1002 a read transducer relative to a magnetic storage medium comprising interspersed magnetic bits, and concurrently reading 1004, using the read transducer, at least two tracks of interspersed magnetic bits as even samples and odd samples with no controlled intersymbol interference. The even and odd samples are transmitted 1006 via a data channel. The data channel signal is equalized to separate even and odd samples, and a full response signal is output 1008. This embodiment further involves independently controlling gains 1010 of an even channel of the even samples and an odd channel of the odd samples to compensate for amplitude asymmetry of even and odd samples received from the data channel. A data sequence is detected 1012 in accordance with a predetermined full or partial response target depending on the optimal data detection requirement using the amplitude adjusted even and odd samples.

Figure 11:
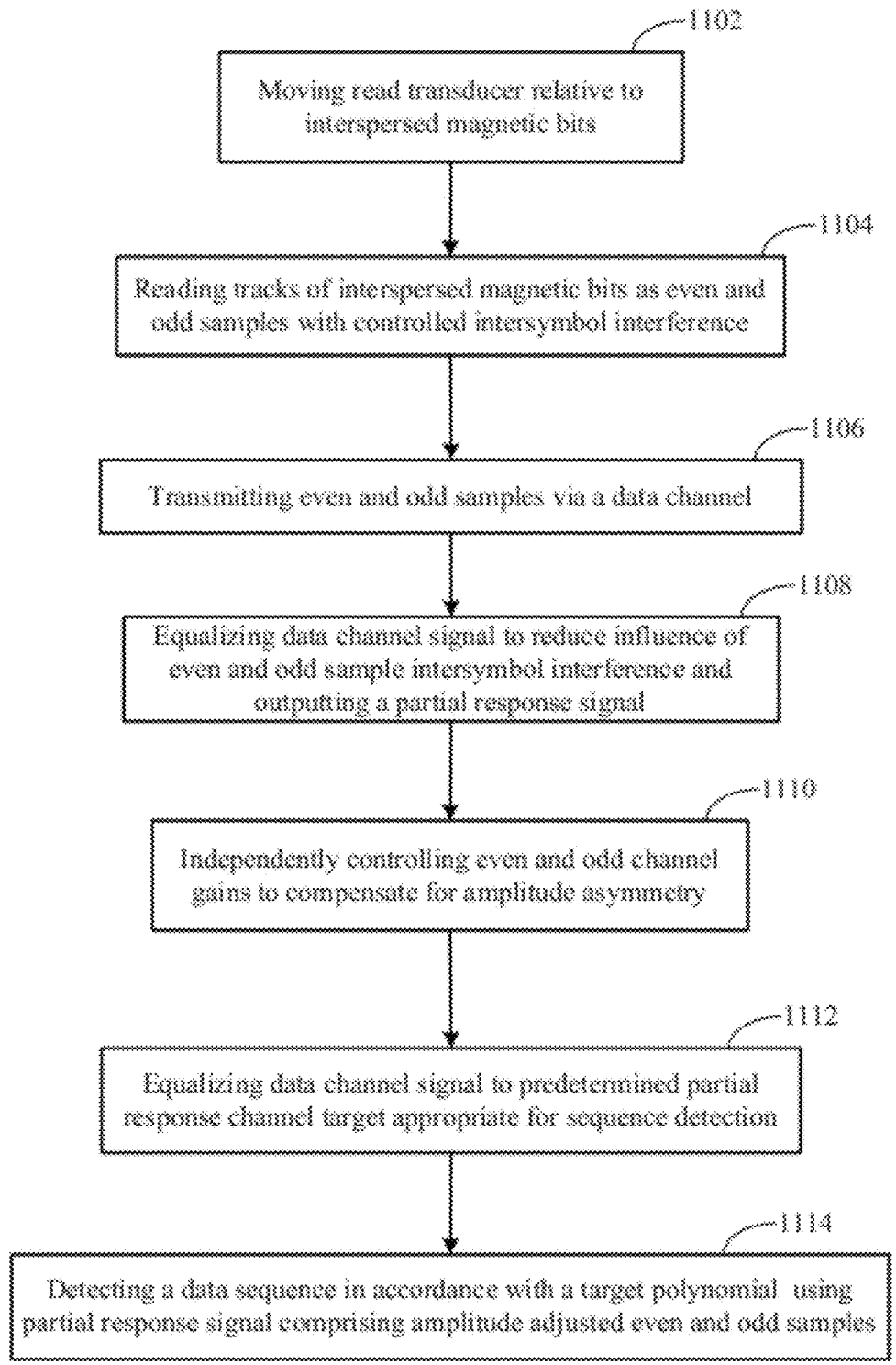

The embodiment shown in FIG. 11 involves moving 1102 a read transducer relative to a magnetic storage medium comprising interspersed magnetic bits, concurrently reading 1104, using the read transducer, at least two tracks of interspersed magnetic bits as even samples and odd samples with controlled intersymbol interference, and transmitting 1106 the even and odd samples via a data channel. This embodiment also involves equalizing the data channel signal to reduce influence of even and odd sample intersymbol interference and outputting 1108 a partial response signal. Gains of an even channel of the even samples and an odd channel of the odd samples are independently controlled 1110 to compensate for amplitude asymmetry of even and odd samples received from the data channel. The data channel signal is equalized 1112 to a predetermined partial response channel target appropriate for sequence detection, and a data sequence is detected 1114 in accordance with a target polynomial (e.g., target=$1-\alpha^2 D^2$) using the partial response signal comprising amplitude adjusted even and odd samples.

It is to be understood that even though numerous characteristics of various embodiments have been set forth in the foregoing description, together with details of the structure and function of various embodiments, this detailed description is illustrative only, and changes may be made in detail, especially in matters of structure and arrangements of parts illustrated by the various embodiments to the full extent indicated by the broad general meaning of the terms in which the appended claims are expressed.

What is claimed is:

1. A method, comprising:
    receiving at a main automatic gain controller (AGC) a data signal generated by a transducer reading magnetic dots interspersed on a patterned magnetic medium, the data signal comprising an even component and an odd component with differing amplitudes;
    adjusting the even component with a first interleaved AGC and the odd component with a second interleaved AGC such that an even component amplitude and an odd component amplitude are substantially equal; and
    recombining the even component and the odd component.

2. The method of claim 1, further comprising:
    performing an analog-to-digital conversion prior to the adjusting step.

3. The method of claim 1, further comprising:
    equalizing the recombined even and odd components with a finite impulse response (FIR) filter.

4. The method of claim 1, wherein the even and odd components are adjusted to compensate for movement of the recording head transducer away from a centerline between two adjacent tracks on the pattered magnetic medium or to compensate for asymmetric side reading of magnetic dots.

5. The method of claim 1, further comprising:
    compensating a servo control system based on the even component and the odd component.

6. The method of claim 1, further comprising:
    adjusting a timing loop of a read channel using the substantially equal even and odd components.

7. The method of claim 1, further comprising:
    shaping the recombined even and odd components in accordance with a predetermined target; and
    performing sequence detection algorithms on the shaped and recombined even and odd components.

8. The method of claim 1, further comprising:
    either processing a full response signal with no controlled intersymbol interference, or processing a partial response signal with controlled intersymbol interference.

9. An apparatus comprising:
    a main automatic gain controller (AGC) to receive a data signal input including an odd component and an even component with differing amplitudes, the data signal generated by a transducer reading recording bits staggered on a magnetic medium comprising recording bits and servo bits; and
    a first interleaved AGC and a second interleaved AGC coupled in parallel to the main AGC;
    wherein the first interleaved AGC adjusts an odd component amplitude and the second interleaved AGC adjusts an even component amplitude to be substantially equal to each other.

10. The apparatus of claim 9, further comprising:
    a finite impulse response (FIR) filter coupled in parallel and downstream relative to the first and second interleaved AGCs to equalize a recombined data signal comprising the even component and the odd component with substantially equal amplitudes.

11. The apparatus of claim 9, further comprising:
    an analog-to-digital converter (ADC) coupled between the main AGC and the first and second interleaved AGCs to convert the data signal.

12. The apparatus of claim 11, further comprising:
    a timing loop that receives the data signal after the first and second AGCs and feeds the data signal back into the main ADC.

13. The apparatus of claim 9, further comprising:
    a gain loop that receives the data signal after the first and second AGCs and feeds the data signal back into one of the main AGC, the first interleaved AGC or the second interleaved AGC to provide further fine or coarse adjustment to the amplitude or phase of the data signal.

14. The apparatus of claim 9, further comprising:
    a maximum likelihood (ML) detector coupled downstream to the first and second interleaved AGCs to receive a uniform amplitude data signal for performing sequence detection algorithms.

15. The apparatus of claim 9, further comprising:
    a servo controller coupled to the first and second interleaved AGCs configured to receive the even and odd components and perform a servo compensation operation based on the amplitudes before the amplitudes have been made substantially equal.

16. A data storage system, comprising:
- a magnetic storage medium comprising a plurality of tracks defined by a plurality of discrete and spaced-apart recording dots arranged in an interspersed pattern;
- a read transducer that generates a data signal based on detecting the recording dots on the magnetic storage medium; and
- a read channel that separates the data signal into an even sample and an odd sample such that a gain can be independently adjusted for each of the even sample and the odd sample to compensate for asymmetry between the even sample and the odd sample.

17. The data storage system of claim 16, wherein the read channel comprises a first automatic gain controller (AGC) to adjust the even sample and a second AGC to adjust the odd sample.

18. The data storage system of claim 16, wherein the even sample correlates to a set of magnetic dots in a first track and the odd sample correlates to a set of magnetic dots in a second track off-set from the first track such that a magnetic dot from the even sample physically resides laterally between a first and second magnetic dot from the odd sample.

* * * * *